(12) United States Patent
Breitzke et al.

(10) Patent No.: US 12,141,600 B2
(45) Date of Patent: Nov. 12, 2024

(54) SYSTEMS AND METHODS FOR EXECUTING REAL-TIME ELECTRONIC TRANSACTIONS WITH A TRANSACTION ACCELERATOR

(71) Applicant: Worldpay, LLC, Symmes Township, OH (US)

(72) Inventors: Lori Breitzke, Atlanta, GA (US); Mattias Nordlof, Denver, CO (US); David Hunter, Elizabeth, CO (US); James M. Batts, IV, Louisville, KY (US)

(73) Assignee: Worldpay, LLC, Symmes Township, OH (US)

( * ) Notice: Subject to any disclaimer, the term of this patent is extended or adjusted under 35 U.S.C. 154(b) by 691 days.

(21) Appl. No.: 17/338,943

(22) Filed: Jun. 4, 2021

(65) Prior Publication Data
US 2022/0391242 A1 Dec. 8, 2022

(51) Int. Cl.
*G06F 9/46* (2006.01)
*G06F 9/54* (2006.01)

(52) U.S. Cl.
CPC .............. *G06F 9/466* (2013.01); *G06F 9/541* (2013.01)

(58) Field of Classification Search
CPC ...................................................... G06F 9/466
See application file for complete search history.

(56) References Cited

U.S. PATENT DOCUMENTS

| 11,727,394 B2 * | 8/2023 | Prabhu et al. ..... G06Q 20/3678 |
| 2004/0193537 A1 * | 9/2004 | Knapp ................... G06F 17/60 |
| 2016/0371661 A1 * | 12/2016 | Shah et al. ............. G06Q 20/10 |
| 2017/0098216 A1 * | 4/2017 | Studnitzer .......... G06Q 20/4014 |
| 2022/0207521 A1 * | 6/2022 | Prabhu et al. ..... G06Q 20/3678 |

* cited by examiner

*Primary Examiner* — James J Debrow
(74) *Attorney, Agent, or Firm* — Bookoff McAndrews, PLLC

(57) ABSTRACT

Systems and methods for executing accelerated electronic transactions are disclosed. One method includes determining, by a transaction accelerator system, an accelerated transaction account status of a user. The transaction accelerator system may receive transaction settlement data from the user based on the account status of the user. The transaction accelerator system may determine an accelerated transaction preference of the user. The transaction accelerator system may determine a settlement value in accordance with the transaction settlement data based on the accelerated transaction preference. The transaction accelerator system may store the settlement value in an accelerated transaction database associated with an accelerated transaction account of the user in real-time.

20 Claims, 7 Drawing Sheets

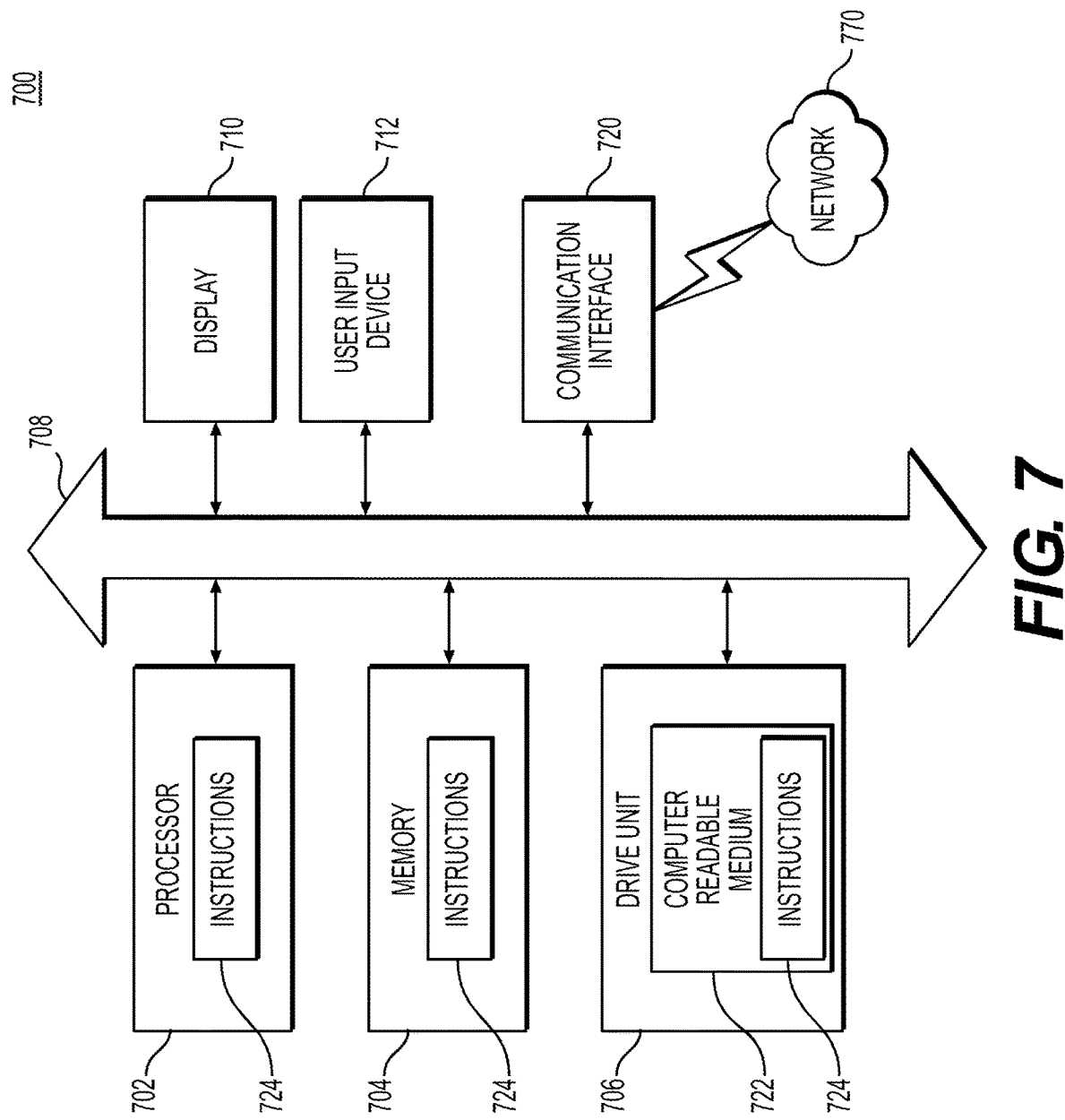

SYSTEMS AND METHODS FOR EXECUTING REAL-TIME ELECTRONIC TRANSACTIONS WITH A TRANSACTION ACCELERATOR

TECHNICAL FIELD

The present disclosure relates generally to the field of electronic transactions and, more particularly, to systems and methods for executing accelerated electronic transactions.

BACKGROUND

Merchants and businesses generally transmit purchase and business transaction settlements in batches to their respective banks to make deposit funds associated with the transaction settlements. For example, a merchant may transmit batches of settled purchase transactions (e.g., credit/debit card purchases) to its bank via the Automated Clearing House (ACH) network. The batches of funds deposited through the conventional processing systems utilizing the ACH network may take two to four days to become available for use. The two to four day delay in making funds available from the time the settlement batches close may have negative implications on everyday merchant or business operations (e.g., delayed payments to vendors or employees, delayed inventory purchases, etc.). Further, unpredictable funding schedules caused by the conventional systems may lead to complications, such as reduced inventory, overdraft fees, etc.

The present disclosure is directed to addressing these and other drawbacks to the existing electronic transaction systems and services.

The background description provided herein is for the purpose of generally presenting context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

One embodiment provides a computer-implemented method of executing accelerated electronic transactions with a transaction accelerator system, comprising: determining, by the transaction accelerator system, an accelerated transaction account status of a user; receiving, by the transaction accelerator system, transaction settlement data from the user based on the account status of the user; determining, by the transaction accelerator system, an accelerated transaction preference of the user; determining, by the transaction accelerator system, a settlement value in accordance with the transaction settlement data based on the accelerated transaction preference; and storing, by the transaction accelerator system, the settlement value in an accelerated transaction database associated with an accelerated transaction account of the user in real-time.

One embodiment provides an accelerated transaction processing system comprising: one or more computer readable media storing instructions for executing accelerated electronic transactions; and one or more processors configured to execute the instructions to perform operations comprising: determining, by a transaction accelerator system, an accelerated transaction account status of a user; receiving, by the transaction accelerator system, transaction settlement data from the user based on the account status of the user; determining, by the transaction accelerator system, an accelerated transaction preference of the user; determining, by the transaction accelerator system, a settlement value in accordance with the transaction settlement data based on the accelerated transaction preference; and storing, by the transaction accelerator system, the settlement value in an accelerated transaction database associated with an accelerated transaction account of the user in real-time.

One embodiment provides a non-transitory computer-readable medium storing instructions for executing accelerated electronic transactions, the instructions, when executed by one or more processors, causing the one or more processors to perform operations comprising: determining, by a transaction accelerator system, an accelerated transaction account status of a user; receiving, by the transaction accelerator system, transaction settlement data from the user based on the account status of the user; determining, by the transaction accelerator system, an accelerated transaction preference of the user; determining, by the transaction accelerator system, a settlement value in accordance with the transaction settlement data based on the accelerated transaction preference; and storing, by the transaction accelerator system, the settlement value in an accelerated transaction database associated with an accelerated transaction account of the user in real-time.

BRIEF DESCRIPTION OF THE DRAWINGS

The accompanying drawings, which are incorporated in and constitute a part of this specification, illustrate several embodiments and together with the description, serve to explain the principles of the disclosure.

FIG. 7 illustrates a computer system for executing the techniques described herein.

DETAILED DESCRIPTION OF EMBODIMENTS

Figure 1:
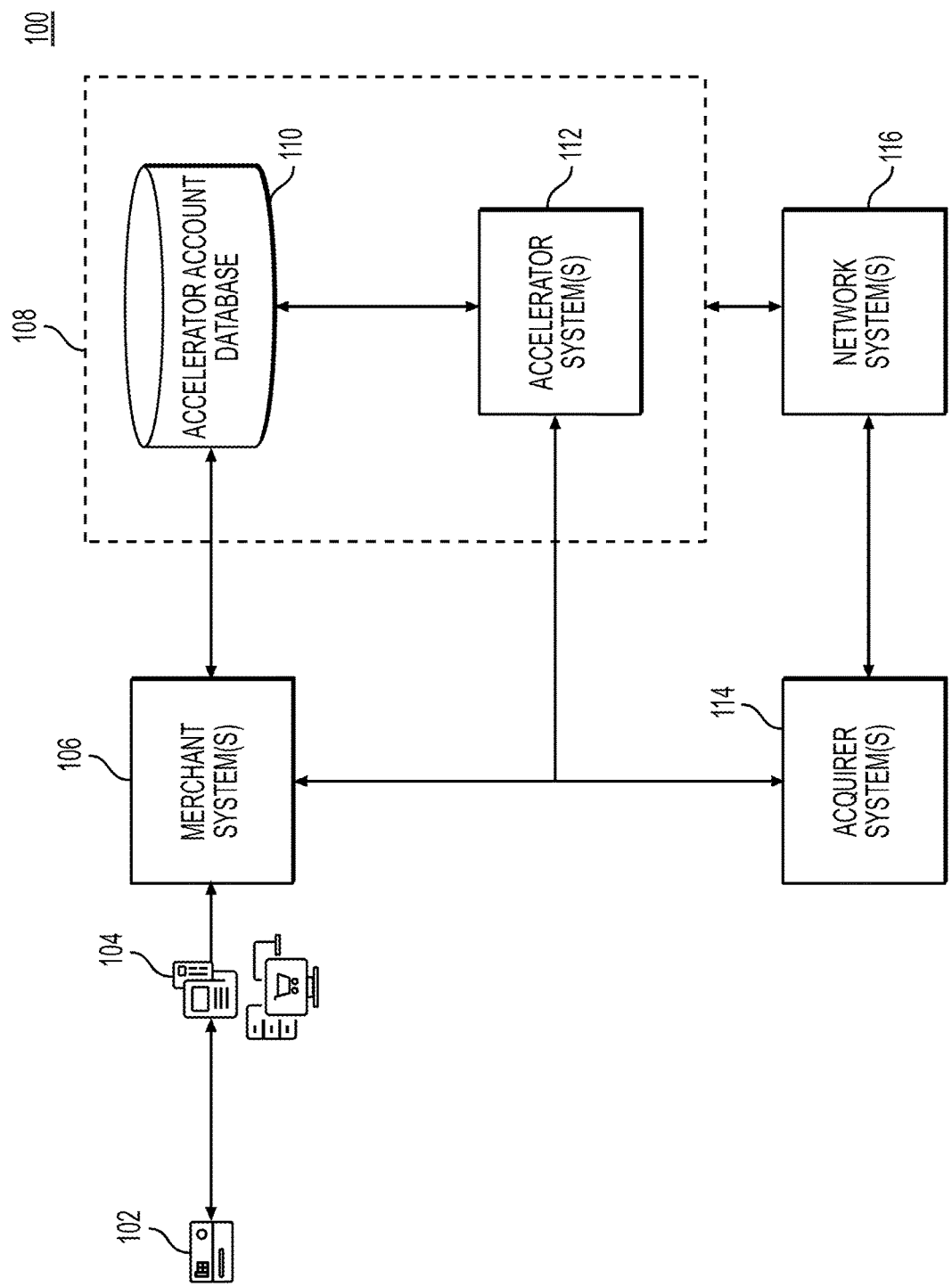
FIG. 1 depicts a block diagram of an exemplary accelerated transaction system, according to one aspect of the present disclosure.

The following embodiments describe systems and methods for facilitating accelerated electronic transactions. More particularly, the embodiments contemplated in the present disclosure may enable merchants and businesses to utilize an accelerated transaction process or service provided by a processing system, which may be configured to execute accelerated payment transactions associated with one or more purchase or business transactions in real-time.

As discussed above, the conventional payment transaction systems may cause delays in making funds available from transaction settlement batches submitted by merchants or businesses. To address these problems, the present disclosure describes systems and methods that provide accelerated transaction processes that may allow participating merchants to instantly access and utilize funds in real-time after transaction settlements batches are transmitted to the accelerator system(s) of the present disclosure.

In one or more embodiments, the present disclosures describe systems and methods that may execute accelerated transactions with an accelerator system(s). In one embodiment, the accelerator system(s) may determine an accelerated transaction account status of a merchant. If the merchant is not a participant of the accelerated transaction, the accelerator system(s) may open an accelerated payment account for the merchant by communicating with an enrollment system(s). The accelerator system(s) may receive transaction settlement data (e.g., purchase transaction data) in one or more batches from the merchant based on the account status of the merchant. The accelerator system(s) may then determine an accelerated transaction preference of the merchant. The merchant may choose to execute a percentage of settlement transactions through the accelerator system(s) and execute the remaining percentage of the settlement transactions through a standard system(s) (e.g., an ACH network system). The accelerator system(s) may update the accelerated payment account of the merchant instantly in real-time with the settlement fund amount based on the accelerated transaction preference. Thus, the accelerator system(s) of the present disclosure may improve transaction settlement speed and transaction processing efficiencies. Further, the merchant may utilize the instant, real-time available funds to improve everyday operations through predictable funding schedules provided by the accelerator system(s) of the present disclosure.

It should be appreciated that particular consideration is made herein to credit or debit card transactions due to the prevalence of these transactions. Despite this reference to credit or debit cards, certain disclosed systems and methods may apply equally well to other payment vehicles (e.g., an Electronic Benefits Transfer (EBT) card, gift card, loyalty card, bonus points card, contactless payment device, digital payment device, digital wallet, etc.), whether "card present" or "card not present" (CNP). Disclosed systems and methods may apply, for example, in online transactions where a user is not physically present at a merchant location. Transactions may include online transactions, debit or credit card transactions, gift card transactions, cryptocurrency transactions, smart card transactions, mobile application transactions, and transactions involving loyalty cards, to name a few. Further, while the party seeking to initiate a payment transaction and/or provide a third-party service may be referred to herein as a "merchant," a party seeking to initiate a payment transaction need not be a merchant, but may be a business, a service provider, or any party seeking to execute a transaction.

The subject matter of the present disclosure will now be described more fully hereinafter with reference to the accompanying drawings, which form a part hereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter may be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Referring now to the appended drawings, FIG. 1 depicts an exemplary system 100 including a payment interface 104, a merchant system(s) 106, a processing system(s) 108, and an acquirer system(s) 114. The merchant system(s) 106 and the processing system(s) 108 may be in communication with a network system(s) 116. The payment interface 104 may include a point of service (POS) terminal and/or a browser that may display a website hosted by the merchant system(s) 106. In one embodiment, the payment interface 104 may be a client-side browser on a user (or customer) computing device, but may also be a client-side app or website for performing e-commerce electronic transactions, or any other type of software or application on a client-side data processor. Additionally or alternatively, the payment interface 104 may be a traditional stand-beside POS, an electronic cash register (ECR), or a mobile device configured to facilitate payment transactions. In some embodiments, the payment interface 104 may collect transaction data (e.g., purchase or payment transaction data) associated with a transaction vehicle 102 (e.g., credit card, debit card, gift card, loyalty card, bonus points card, contactless payment device, digital payment device, digital wallet, etc.) upon a user (e.g., a customer, a beneficiary, etc.) submitting the transaction vehicle 102 (or information associated with the transaction vehicle 102) at the payment interface 104. Further, the payment interface 104 may transfer the transaction data associated with the transaction vehicle 102 to the merchant system(s) 106 and/or the processing system(s) 108. Additionally or alternatively, the merchant system(s) 106 may collect, via an online or offline interface, the transaction data associated with the transaction vehicle 102 and transmit the transaction data to the processing system(s) 108 or the acquirer system(s) 114 therein. The processing system(s) 108, or the acquirer system(s) 114, may communicate with the network system(s) 116 to execute one or more transactions based on the received transaction data from the payment interface 104. The network system(s) 116 may include, for example, an issuer system(s) and/or a payment network system(s) (e.g., the ACH network system(s)).

Still referring to FIG. 1, the processing system(s) 108 may include an accelerator account database 110 and an accelerator system(s) 112. The accelerator account database 110 may include merchant information necessary to facilitate the execution of the accelerated transaction of the present disclosure. For example, the accelerator account database 110 may include merchant account numbers, merchant account statuses, accelerated funding preferences, etc. The accelerator system(s) 112 may communicate with the merchant system(s) 106, accelerator account database 110, acquirer system(s) 114, and the network system(s) 116 to execute the accelerated transaction process contemplated in one or more embodiments of the present disclosure.

Figure 2:
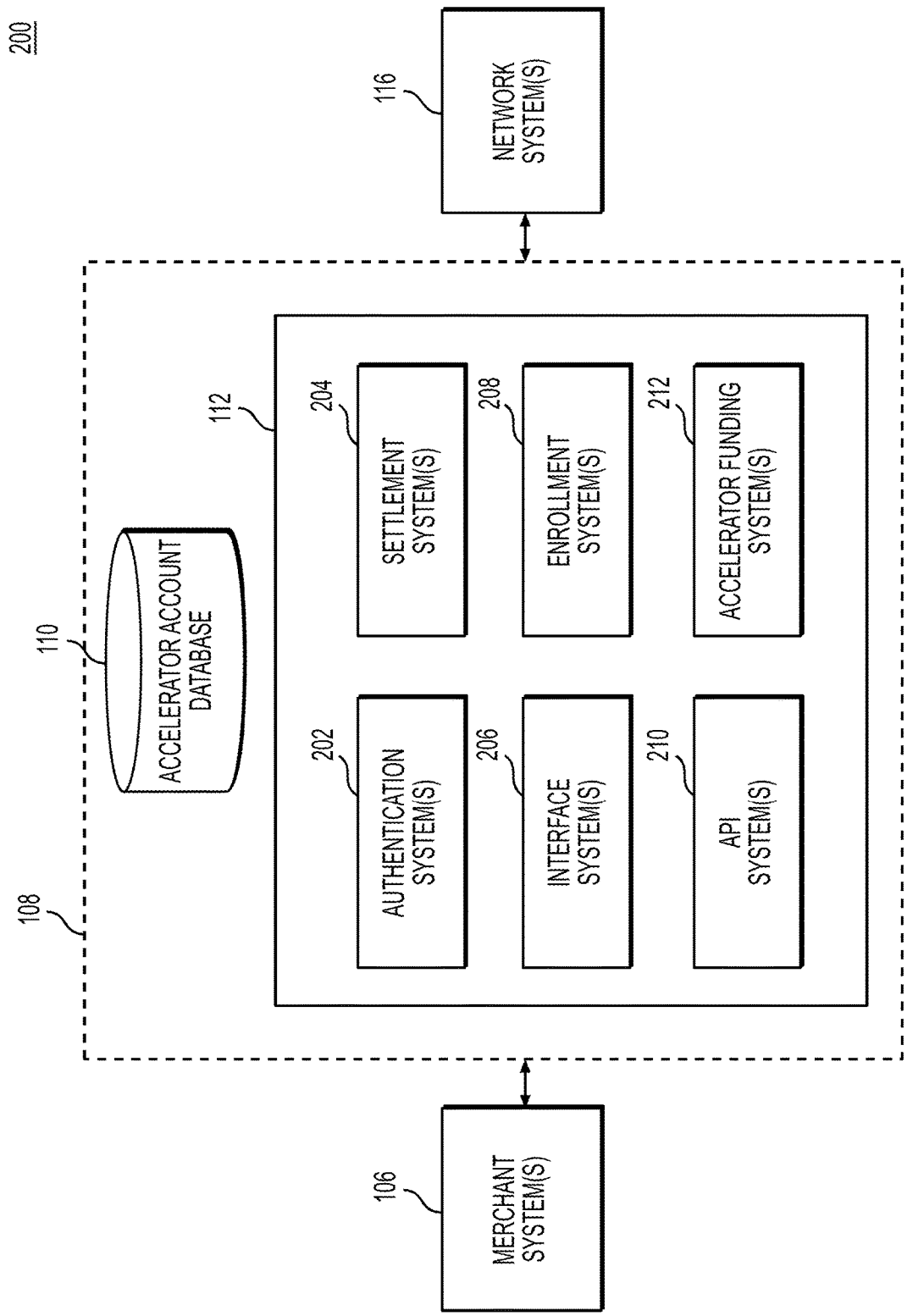
FIG. 2 depicts a block diagram of another exemplary accelerated transaction system, according to one aspect of the present disclosure.

FIG. 2 shows a block diagram of an exemplary system 200 comprising the merchant system(s) 106, the processing system(s) 108, and the network system(s) 116. Further, FIG. 2 depicts a more detailed example illustration of the accelerator system(s) 112, but should not be construed as limiting the system 100 or accelerator system(s) 112. In one embodiment, the accelerator system(s) 112 may comprise an authentication system(s) 202, a settlement system(s) 204, an interface system(s) 206, an enrollment system(s) 208, an API system(s) 210, and an accelerator funding system(s) 212. In one embodiment, the authentication system(s) 202 may be configured to communicate with the merchant system(s) 106 and the accelerator account database 110 to execute authentication of merchant account information associated with one or more merchants of the merchant system(s) 106. For example, the authentication system(s) 202 may be configured to determine whether or not a merchant (or merchants) associated with the merchant system(s) 106 may be an existing merchant having an account with the processing system(s) 108 of the present disclosure. If the merchant is not an existing merchant in the processing system(s) 108, the enrollment system(s) 208 may facilitate an enrollment process to create or open a merchant account in the processing system(s) 108 and/or accelerator system(s) 112.

Still referring to FIG. 2, the interface system(s) 206 may be configured to provide one or more user interfaces for facilitating communication between the merchant system(s) 106 and the processing system(s) 108. For example, the interface system(s) 206 may be configured to provide graphical user interfaces displaying one or more options or instructions to a merchant (or user). A merchant associated with the merchant system(s) 106 may utilize the user interface to interact with the processing system(s) 108 (e.g., the accelerator system(s) 112). In some embodiments, the interface system(s) 206 may provide one or more interface portals configured to allow a merchant to access account information and reports via the interface portal. Additionally or alternatively, a merchant may utilize the interface portals to enroll or create an account with the processing system(s) 108 via the enrollment system(s) 208. In one embodiment, the interface portals may be configured to communicate with the accelerator funding system(s) 212 to receive and transmit commands to transfer funds and/or transmit disbursements to various recipient accounts. Further, the interface portals may be configured to provide reconciliation details and reports associated with transaction settlement funds, transfer funds, disbursements, accounts statuses, account balances, etc.

Still referring to FIG. 2, in one embodiment, the settlement system(s) 204 may be configured to facilitate transmission of transaction settlement data to the accelerator funding system(s) 212, acquirer system(s) 114, and or the network system(s) 116. The settlement system(s) 204 may transmit one or more batches of transaction settlements (e.g., purchase or payment transaction settlements) to the accelerator funding system(s) 212, the acquirer system(s) 114, and/or the network system(s) 116.

Still referring to FIG. 2, the accelerator funding system(s) 212 may be configured to facilitate processing of settlement funds received from the settlement system(s) 204. Additionally or alternatively, the accelerator funding system(s) 210 may be configured to communicate with an affiliated financial system (or an accelerator bank) to make funds available to the merchants that participate in the accelerated transactions of the present disclosure. For example, a merchant participating in the accelerated transactions of the present disclosure may provide transaction settlement data, via the merchant system(s) 106, to the settlement system(s) 204. The settlement system(s) 204 may then transmit (or load) one or more batches of the settlements to the accelerator funding system(s) 212. The accelerator funding system(s) 212, by communicating with the accelerator bank, may make the funds associated with the one or more batches of the settlements instantaneously available in real-time. In one or more embodiments, the accelerator bank may provide direct deposit accounts (DDA accounts) for the merchants participating in the accelerated transactions of the present disclosure.

Still referring to FIG. 2, the API system(s) 210 may utilize an application programming interface (API) server (not shown) that may provide various APIs to facilitate communication between various components (or systems) of the systems 100 and 200 to execute the accelerated transactions of the present disclosure. Further the API systems(s) 210 may communicate with cloud services to facilitate the accelerated transaction of the present disclosure. Further, the API system(s) 210 may be configured to execute updating of the accelerator account database by communicating with the merchant system(s) 106, the settlement system(s) 204, the enrollment systems(s) 208, and/or the accelerator funding system(s) 212.

Figure 3:
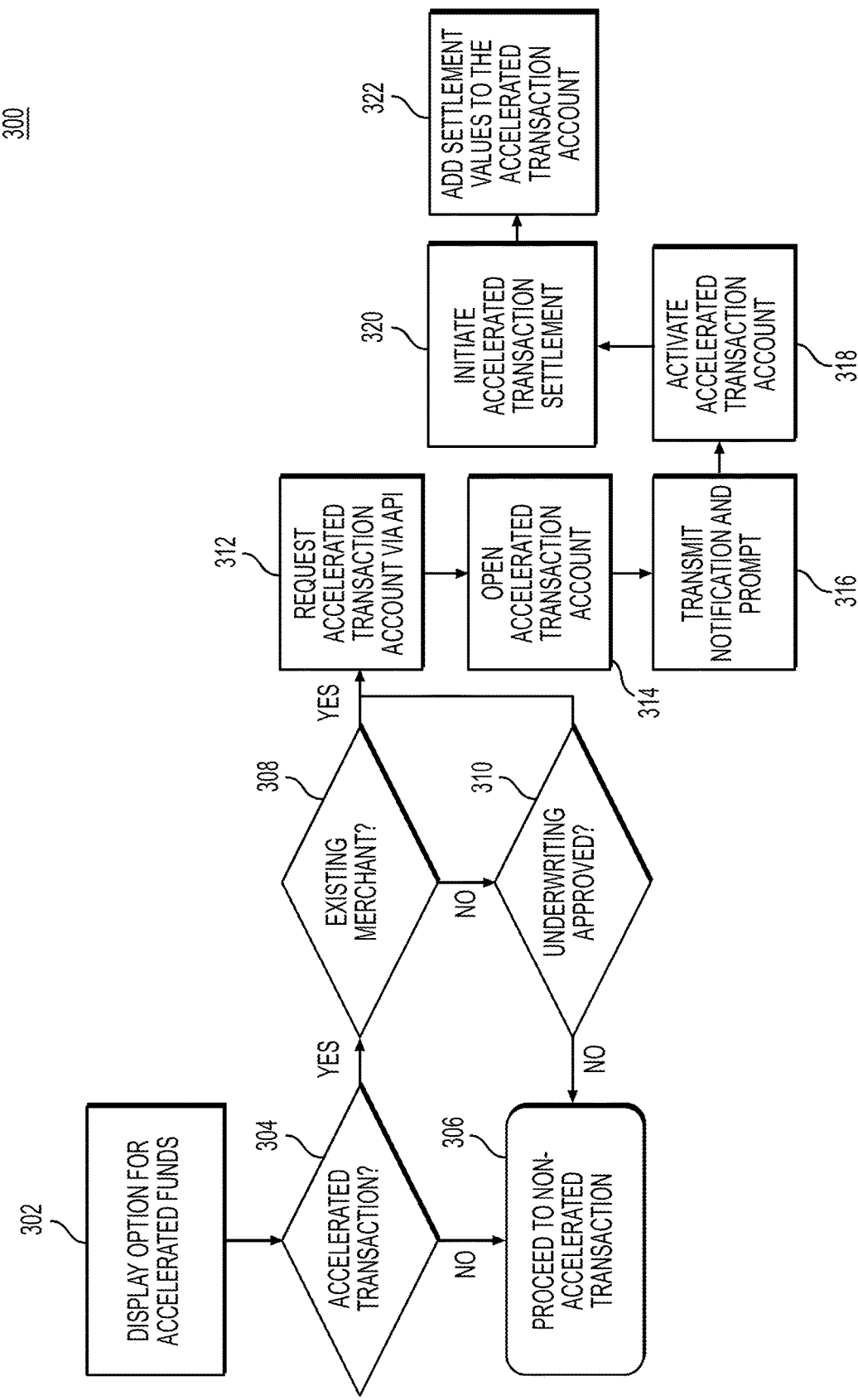
FIG. 3 depicts a flowchart illustrating an exemplary method of executing an accelerated transaction, according to one aspect of the present disclosure.

FIG. 3 depicts a flowchart of an exemplary method 300 for executing an accelerated transaction using the systems of FIGS. 1-2, according to one aspect of this disclosure. In one embodiment, the method 300 may be executed by the systems 100 and/or 200.

At step 302, the interface system(s) 206 may cause to display an option or prompt, via the merchant system(s) 106, to a merchant for participating in the accelerated transaction of the present disclosure. At step 304, the interface system(s) 206 may determine whether the merchant selected to participate in the accelerated transaction. At step 306, if the merchant declines to participate in the accelerated transaction, the processing system(s) 108 may proceed to process the merchant transaction in a standard (or non-accelerated) manner (e.g., via the ACH network system). For example, the processing system(s) 108 may transmit batches of transaction settlements received from the merchant system(s) 106 to the network system(s) 116 (e.g., via the ACH network system). In this example, the batches of transaction settlements may be processed and deposited into the acquiring system(s) 114 (or merchant bank) associated with the merchant. Such funds may become available for use by the merchant, for example, in two to four days.

At step 308, if the merchant selects to participate in the accelerated transaction, the authentication system(s) 202 may determine whether the merchant is an existing merchant having an account with the processing system(s) 108. If the merchant does not exist in the processing system(s) 108, the enrollment system(s) 208 may perform an underwriting process to determine whether or not the merchant is eligible to participate in the accelerated transaction of the present disclosure at step 310. If the merchant is not eligible based on the underwriting process, the processing system(s) 108 may proceed to process the merchant transaction in a standard, non-accelerated manner, as described at step 306 above. At step 312, if the merchant has an existing account with the processing system(s) 108 or the merchant is approved via the underwriting process at step 310, the API system(s) 210 may generate an API message to request opening an accelerated transaction account (e.g., a prepaid or prefunded debit account) for the merchant. At step 314, the enrollment system(s) 208 may open an accelerated transaction account for the merchant. Additionally, the enrollment system(s) 208 may issue a payment vehicle (e.g., a physical plastic prepaid card for POS purchases and cash access) associated with the accelerated transaction account of the merchant. In one embodiment, the merchant may use the payment vehicle associated with the accelerated transaction account in any suitable manner or place where the payment vehicle may be accepted. The processing system(s) 108 may then transmit, via the interface system(s) 206, a notification and prompt to the merchant system(s) 106. At step 318, the processing system(s) 108 may activate the accelerated transaction account of the merchant by storing the accelerated transaction account information of the merchant in the accelerator account database 110. For example, the accelerated transaction account information may include accelerated transaction account numbers, accelerated transaction account statuses, accelerated transaction funding preferences, etc. At step 320, the settlement system(s) 204 may initiate an accelerated transaction settlement process by transmitting one or more batches of transaction settlement data based on the accelerated transaction funding preferences of the merchant. At step 322, the accelerator funding system(s) 212 may add settlement funds determined based on the transaction settlement batches to the accelerated transaction account by communicating with the accelerator bank of the accelerator funding system(s) 212. The settlement funds added to the accelerated transaction account may become available for use by the merchant instantly in real-time (further described in detail below). In some embodiments, the availability timing of the settlement funds in the accelerated transaction account may be varied based on the timing the settlement batches are received by the accelerator funding system(s) 212. For example, any settlement batch received by: 10:30 AM may be available by 1:00 PM on the same day; 2:45 PM may be available by 5:00 PM on the same day; and after 8:00 PM and before 1:00 AM may be available the next day by 8:30 AM. Of course, these are exemplary, alternative and/or additional funding scenarios not to be construed as limiting scenarios to the real-time settlement fund availability process described in accordance with the present disclosure.

Figure 4:
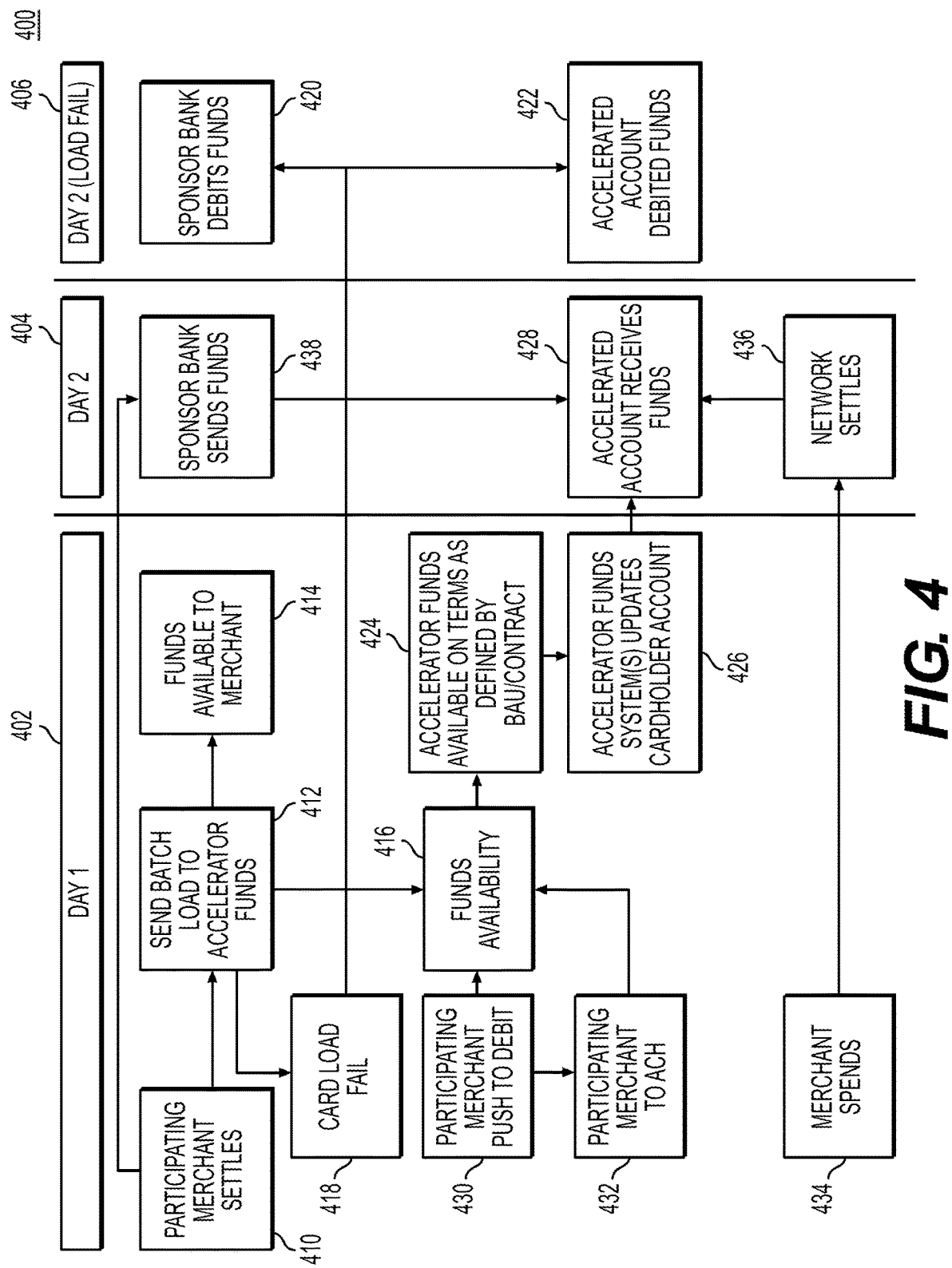
FIG. 4 depicts a flowchart illustrating another exemplary method of executing an accelerated transaction, according to one aspect of the present disclosure.

FIG. 4 depicts a flowchart of an exemplary method 400 for executing an accelerated transaction using the systems and processes of FIGS. 1-3, according to one aspect of this disclosure. In one embodiment, the method 400 may be executed by the systems 100 and 200. Further, the steps of the method 400 shown in section 402 shown in FIG. 4 may be executed on day one, and the steps shown in sections 404 and 406 may be executed, for example, on day two.

At step 410, during day one 402, a merchant participating in the accelerated transaction (participating merchant) of the present disclosure may request to settle one or more batches of transactions (e.g., purchase or payment transactions). That is, the merchant system(s) 106 associated with the participating merchant may transmit settled transaction data to the settlement system(s) 204. At step 412, the settlement system(s) 204 may then send one or more settlement batches to the accelerator funding system(s) 212. At step 414, the settled batches of transactions may become available to the merchant instantly in real-time during day one 402. For example, the accelerator funding system(s) 212 may update the accelerator account balance of the participating merchant instantly in real-time. At step 416, the accelerator funding system(s) 212 may determine the amount of funds that may be available for the immediate use of the participating merchant. The availability of funds may be determined, for example, at least based on one or more predetermined preferences of the participating merchant, as well as the participating merchant's spending activities. In one embodiment, at step 430, the participating merchant may push to debit one or more disbursements to various recipients from its accelerated transaction account. For example, the participating merchant (or business) may schedule various disbursements (e.g., employee salaries, contractor payments, vendor payments, tip outs, etc.) from its accelerated transaction account at various dates or times. Further, at step 432, the participating merchant may choose to transmit a portion of the settlement batches to a non-accelerated transaction account. For example, the participating merchant may choose to transmit a portion of the settlement batches to its demand deposit bank account (DDA account) through the standard ACH network. The processing system(s) 108 may then process the portion of the settlement batches via network system(s) 116 (e.g., the ACH network system).

Figure 5:
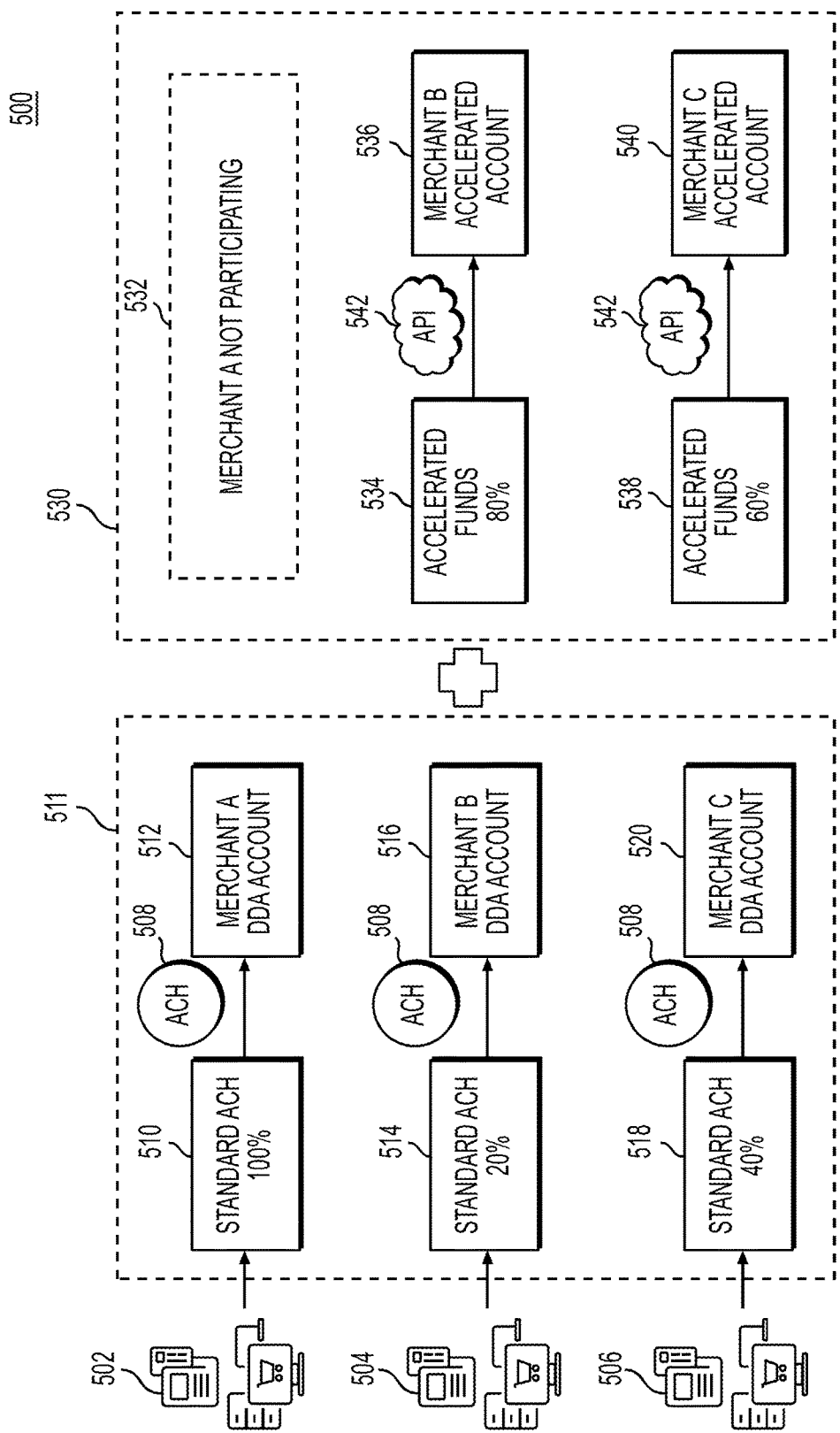
FIG. 5 depicts a flowchart illustrating yet another exemplary method of executing an accelerated transaction, according to one aspect of the present disclosure.

FIG. 5 depicts a flowchart illustrating an exemplary method 500 of executing accelerated transactions based on predetermined merchant preferences, according to one aspect of the present disclosure. The predetermined merchant preferences may include a standard transaction preference 511 and an accelerated transaction preference 530. The predetermined merchant preferences may be stored in the accelerator account database 110. In one embodiment, Merchant A 502, Merchant B 504, and Merchant C 506 may set different preferences for processing the purchase transactions received through their respective payment interfaces. For example, at step 510, Merchant A 502 may set its preference to process 100% of purchase (or payment) transaction settlement batches through the standard ACH network 508. At step 512, Merchant A 502 may receive the funds associated with the settlement batches in its merchant DDA account once the ACH network 508 clears or verifies the transaction batches by communicating with the respective issuing systems (or banks) and/or acquiring systems (e.g., acquirer system(s) 114). As such, the funds associated with the settlement batches of Merchant A 502 may become available for use from the merchant A DDA account, for example, in two to four days. In this example, Merchant A 502 may not be participating 532 in the accelerated transaction in accordance with the present disclosure. In another example, at step 514, Merchant B 504 may set its preference to process 20% of the purchase transaction settlement batches through the standard ACH network 508 and 80% of the purchase transaction settlement batches through the accelerator funding system(s) 210. At step 516, Merchant B 504 may receive 20% of the funds associated with the settlement batches in the merchant DDA account once the ACH network 508 clears or verifies the transaction batches by communicating with the respective issuing systems (or banks) and/or acquiring systems (or banks). As such, 20% of the funds associated with the settlement batches may become available for use from the DDA account of Merchant B 504 in, for example, two to four days. However, at step 534, the accelerator funding system(s) 212 may cause to transmit, via an API message 542, 80% of the funds associated with the purchase transaction settlement batches to the accelerated transaction account of Merchant B 504. At step 536, 80% of the funds may become available for use by Merchant B 504 instantly in real-time in accordance with process 400 in FIG. 4. In yet another example, Merchant C 506 may set its preference to process 40% of purchase transaction settlement batches through the standard ACH network 508 and 60% of the purchase transaction settlement batches through the accelerator funding system(s) 212. The funds associated with the settlement batches may be processed and become available for use by Merchant C through steps 518, 520, 538, and 540, in a manner similar to the steps 514, 516, 534, and 536, as described in accordance with Merchant B 504. Of course, other suitable merchant preferences may be realized in a similar manner to the process 500 shown in FIG. 5.

Referring back to FIG. 4, at step 424, the accelerator funding system(s) 212 may determine the amount of available funds in the accelerated transaction accounts of the merchants based on the merchant preferences as described in the process 500 of FIG. 5 above. Additionally, the amount of available funds may be determined based on the participating merchant disbursement setting disclosed in step 430. At step 426, the accelerator funding system(s) 212 may update the accelerated transaction account (or cardholder account) of the participating merchant in day one 402. At step 428, the accelerator bank of the accelerator funding system(s) 212 may receive the amount of funds associated with the settlement batches when a sponsor financial institution (or a bank) affiliated with processing system(s) 108 transmits the funds on day two 404. As such, the accelerator funding system(s) 212 may provide prepaid funds instantly in real-time by utilizing the immediately available funds provided by the accelerator bank of the accelerator funding system(s) 212. The accelerator funding system(s) 212 may replenish or fund the DDA account associated with the participating merchant at the accelerator bank later on day two 404 based on the merchant preferences and spending activities. For example, at step 434, when a merchant spends the available funds in the accelerated transaction account by using, for example, the payment vehicle associated with the accelerated transaction account, the balance of the accelerated transaction account may be updated once the network system(s) 116 settles the spending at step 436.

Still referring to FIG. 4, in one embodiment, at step 418, if the settlement batches transmitted merchant system(s) 106 fails to load by the settlement system(s) 204, a message may be transmitted to the participating merchant, notifying the transaction failure. However, the amount of funds associated with failed settlement batches may still be available to the participating merchant at step 414 on day one 402. Thereafter, at steps 420 and 422, the sponsor bank of the processing system(s) 108 may later debit the amount of funds associated with the failed settlement batches from the accelerated transaction account of the participating merchant on day two 406. Thus, the participating merchant may have an instant, real-time access to transaction settlement funds even through failed transaction settlement batches due to, for example, fraud, system errors, etc.

Figure 6:
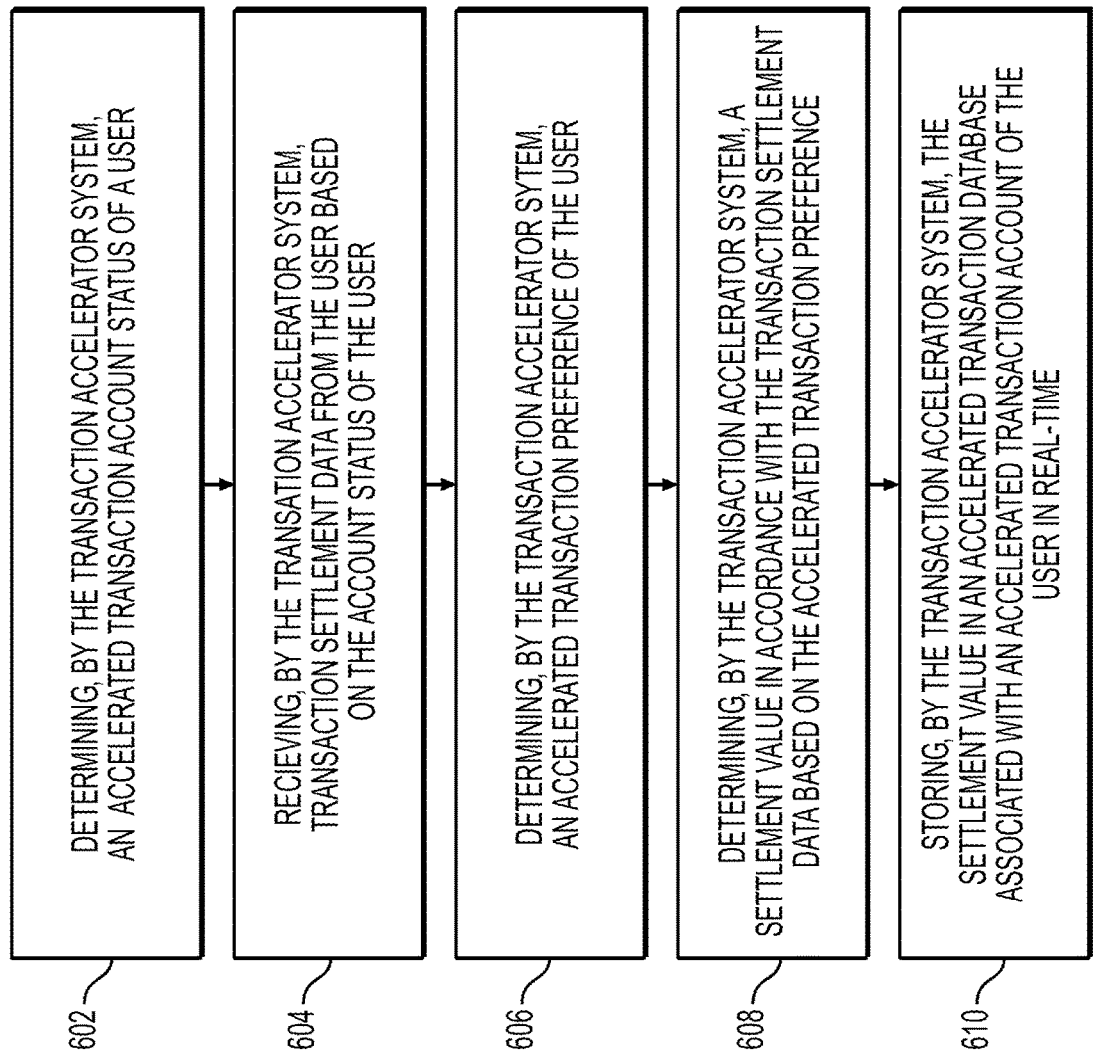
FIG. 6 depicts a flowchart illustrating yet another exemplary method of executing a filtered transaction, according to one aspect of the present disclosure.

FIG. 6 depicts a flowchart of an exemplary method 600 for executing an accelerated transaction using the systems and processes of FIGS. 1-5, according to one aspect of this disclosure. In one embodiment, the method 600 may be executed by the systems 100 and 200.

At step 602, a transaction accelerator system (e.g., the accelerator system(s) 112 may determine an accelerated transaction account status of a user (e.g., a merchant of a merchant system(s) 105). In one embodiment, the user may be a merchant or a business. In one embodiment, upon determining the accelerated transaction status of the user, the transaction accelerator system may generate an accelerated transaction prompt to the user. Further, the transaction accelerator system may receive a response to the accelerated transaction prompt from the user. Additionally, upon receiving the response to the accelerated transaction prompt, the transaction accelerator system may determine an eligibility of the user for opening the accelerated transaction account based on the account status. In one embodiment, the transaction accelerator system, may generate an accelerated transaction Application Programming Interface (API) message for opening the accelerated transaction account of the user.

At step 604, the transaction accelerator system may receive transaction settlement data (e.g., one or more purchase or transactions) from the user based on the account status of the user. In one embodiment, the transaction accelerator system may receive the transaction settlement data in one or more batches. At step 606, the transaction accelerator system may determine an accelerated transaction preference of the user. In one embodiment, the accelerated transaction preference may comprise an instruction for transmitting a first amount of the settlement value to the accelerated transaction database and a second amount of the settlement value to a database of an acquirer system (e.g., acquirer system(s) 114) associated with the user.

At step 608, the transaction accelerator system may determine a settlement value (e.g., purchase or payment amount) in accordance with the transaction settlement data based on the accelerated transaction preference. In one embodiment, the settlement value may be associated with a purchase transaction fund amount associated with the user. At step 610, the transaction accelerator system may store the settlement value in an accelerated transaction database (e.g., accelerator account database 110) associated with an accelerated transaction account of the user in real-time.

The systems and methods of the present disclosure described herein may utilize a software development kit (SDK) server (not shown) that may provide various SDK functions (or SDK) that the merchant system(s) 106, the payment interface 104, and the processing system(s) 108. The SDK functions may be utilized to configure the merchant system(s) 106, the payment interface 104, and the processing system(s) 108 to facilitate communication between each other and to execute the electronic transactions of the present disclosure. Further, the merchant system(s) 106, the payment interface 104, and the processing system(s) 108 may utilize an application programming interface (API) server (not shown) that may provide various APIs to facilitate communication between each other and to execute the electronic transactions of the present disclosure. The systems, processes, and methods of the present disclosure solve the technological problems arising in the conventional electronic transaction technology. That is, the systems, processes, and methods of the present disclosure described herein are directed to an improvement in the conventional electronic transaction technical field and are practically applicable to the field of executing accelerated electronic transactions by utilizing the accelerator system(s) 112 of the processing system(s) 108 contemplated herein.

In addition to a standard desktop, or server, it is fully within the scope of this disclosure that any computer system capable of the required storage and processing demands would be suitable for practicing the embodiments of the present disclosure. This may include tablet devices, smart phones, pin pad devices, and any other computer devices, whether mobile or even distributed on a network (i.e., cloud based).

Unless specifically stated otherwise, as apparent from the following discussions, it is appreciated that throughout the specification discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

FIG. 7 illustrates a computer system designated 700. The computer system 700 can include a set of instructions that can be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system 700 may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 700 can be implemented using electronic devices that provide voice, video, or data communication. Further, while a single computer system 700 is illustrated, the term "system" shall also be taken to include any collection of systems or sub-systems that individually or jointly execute a set, or multiple sets, of instructions to perform one or more computer functions.

As illustrated in FIG. 7, the computer system 700 may include a processor 702, e.g., a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 704 includes a cache or random-access memory for the processor 702. In alternative implementations, the memory 704 is separate from the processor 702, such as a cache memory of a processor, the system memory, or other memory. The memory 704 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 704 is operable to store instructions executable by the processor 702. The functions, acts or tasks illustrated in the figures or described herein may be performed by the programmed processor 702 executing the instructions stored in the memory 704. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel payment and the like.

As shown, the computer system 700 may further include a display unit 710, such as a liquid crystal display (LCD), an organic light emitting diode (OLED), a flat panel display, a solid-state display, a cathode ray tube (CRT), a projector, a printer or other now known or later developed display device for outputting determined information. The display 710 may act as an interface for the user to see the functioning of the processor 702, or specifically as an interface with the software stored in the memory 704 or in the drive unit 706.

Additionally or alternatively, the computer system 700 may include an input device 712 configured to allow a user to interact with any of the components of system 700. The input device 712 may be a number pad, a keyboard, or a cursor control device, such as a mouse, or a joystick, touch screen display, remote control, or any other device operative to interact with the computer system 700.

The computer system 700 may also or alternatively include a disk or optical drive unit 706. The disk drive unit 706 may include a computer-readable medium 722 in which one or more sets of instructions 724, e.g., software, can be embedded. Further, the instructions 724 may embody one or more of the methods or logic as described herein. The instructions 724 may reside completely or partially within the memory 704 and/or within the processor 702 during execution by the computer system 700. The memory 704 and the processor 702 also may include computer-readable media as discussed above.

In some systems, a computer-readable medium 722 includes instructions 724 or receives and executes instructions 724 responsive to a propagated signal so that a device connected to a network 770 can communicate voice, video, audio, images, or any other data over the network 770. Further, the instructions 724 may be transmitted or received over the network 770 via a communication port or interface 720, and/or using a bus 708. The communication port or interface 720 may be a part of the processor 702 or may be a separate component. The communication port 720 may be created in software or may be a physical connection in hardware. The communication port 720 may be configured to connect with a network 770, external media, the display 710, or any other components in system 700, or combinations thereof. The connection with the network 770 may be a physical connection, such as a wired Ethernet connection or may be established wirelessly as discussed below. Likewise, the additional connections with other components of the system 700 may be physical connections or may be established wirelessly. The network 770 may alternatively be directly connected to the bus 708.

While the computer-readable medium 722 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 722 may be non-transitory, and may be tangible.

The computer-readable medium 722 can include a solid-state memory such as a memory card or other package that houses one or more non-volatile read-only memories. The computer-readable medium 722 can be a random-access memory or other volatile re-writable memory. Additionally or alternatively, the computer-readable medium 722 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 700 may be connected to one or more networks 770. The network 770 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 770 may include wide area networks (WAN), such as the Internet, local area networks (LAN), campus area networks, metropolitan area networks, a direct connection such as through a Universal Serial Bus (USB) port, or any other networks that may allow for data communication. The network 770 may be configured to couple one computing device to another computing device to enable communication of data between the devices. The network 770 may generally be enabled to employ any form of machine-readable media for communicating information from one device to another. The network 770 may include communication methods by which information may travel between computing devices. The network 770 may be divided into sub-networks. The sub-networks may allow access to all of the other components connected thereto or the sub-networks may restrict access between the components. The network 770 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel payment. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosed embodiments are not limited to any particular implementation or programming technique and that the disclosed embodiments may be implemented using any appropriate techniques for implementing the functionality described herein. The disclosed embodiments are not limited to any particular programming language or operating system.

It should be appreciated that in the above description of exemplary embodiments, various features of the embodiments are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that a claimed embodiment requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the present disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the function.

In the description provided herein, numerous specific details are set forth. However, it is understood that embodiments of the present disclosure may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described what are believed to be the preferred embodiments of the present disclosure, those skilled in the art will recognize that other and further modifications may be made thereto without departing from the spirit of the present disclosure, and it is intended to claim all such changes and modifications as falling within the scope of the present disclosure. For example, any formulas given above are merely representative of procedures that may be used. Functionality may be added or deleted from the block diagrams and operations may be interchanged among functional blocks. Steps may be added or deleted to methods described within the scope of the present disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method of executing accelerated electronic transactions with a transaction accelerator system, comprising:
determining, by the transaction accelerator system, an accelerated transaction account status of a user;
receiving, by the transaction accelerator system, transaction settlement data from the user based on the account status of the user;
determining, by the transaction accelerator system, an accelerated transaction preference of the user, wherein the accelerated transaction preference includes a percentage of the transaction specified for acceleration and a remaining percentage of the transaction specified for processing through a standard system;
determining, by the transaction accelerator system, a settlement value in accordance with the transaction settlement data based on the accelerated transaction preference, wherein the settlement value represents a value equivalent to the transaction specified for acceleration; and
storing, by the transaction accelerator system, the settlement value in an accelerated transaction database associated with an accelerated transaction account of the user in real-time.

2. The method of claim 1, further comprising:
upon determining the accelerated transaction status of the user, generating, by the transaction accelerator system, an accelerated transaction prompt to the user; and
receiving, by the transaction accelerator system, a response to the accelerated transaction prompt from the user.

3. The method of claim 2, further comprising:
upon receiving the response to the accelerated transaction prompt, determining, by the transaction accelerator system, an eligibility of the user for opening the accelerated transaction account based on the account status.

4. The method of claim 1, further comprising:
generating, by the transaction accelerator system, an accelerated transaction Application Programming Interface (API) message for opening the accelerated transaction account of the user.

5. The method of claim 1, wherein the accelerated transaction preference comprises an instruction for transmitting a first amount of the settlement value to the accelerated transaction database and a second amount of the settlement value to a database of an acquirer system associated with the user.

6. The method of claim 1, further comprising:
receiving, by the transaction accelerator system, the transaction settlement data in one or more batches.

7. The method of claim 1, wherein the user is a merchant; wherein the settlement value is associated with a purchase transaction fund amount associated with the user.

8. An accelerated transaction processing system comprising:
one or more computer readable media storing instructions for executing accelerated electronic transactions; and
one or more processors configured to execute the instructions to perform operations comprising:
determining, by a transaction accelerator system, an accelerated transaction account status of a user;
receiving, by the transaction accelerator system, transaction settlement data from the user based on the account status of the user;
determining, by the transaction accelerator system, an accelerated transaction preference of the user, wherein the accelerated transaction preference includes a percentage of the transaction specified for acceleration and a remaining percentage of the transaction specified for processing through a standard system;

determining, by the transaction accelerator system, a settlement value in accordance with the transaction settlement data based on the accelerated transaction preference, wherein the settlement value represents a value equivalent to the transaction specified for acceleration; and storing, by the transaction accelerator system, the settlement value in an accelerated transaction database associated with an accelerated transaction account of the user in real-time.

9. The system of claim 8, the operations further comprising:

upon determining the accelerated transaction status of the user, generating, by the transaction accelerator system, an accelerated transaction prompt to the user; and receiving, by the transaction accelerator system, a response to the accelerated transaction prompt from the user.

10. The system of claim 9, the operations further comprising:

upon receiving the response to the accelerated transaction prompt, determining, by the transaction accelerator system, an eligibility of the user for opening the accelerated transaction account based on the account status.

11. The system of claim 8, the operations further comprising:

generating, by the transaction accelerator system, an accelerated transaction Application Programming Interface (API) message for opening the accelerated transaction account of the user.

12. The system of claim 8, wherein the accelerated transaction preference comprises an instruction for transmitting a first amount of the settlement value to the accelerated transaction database and a second amount of the settlement value to a database of an acquirer system associated with the user.

13. The system of claim 8, the operations further comprising:

receiving, by the transaction accelerator system, the transaction settlement data in one or more batches.

14. The system of claim 8, wherein the user is a merchant; wherein the settlement value is associated with a purchase transaction fund amount associated with the user.

15. A non-transitory computer-readable medium storing instructions for executing accelerated electronic transactions, the instructions, when executed by one or more processors, causing the one or more processors to perform operations comprising:

determining, by a transaction accelerator system, an accelerated transaction account status of a user;

receiving, by the transaction accelerator system, transaction settlement data from the user based on the account status of the user;

determining, by the transaction accelerator system, an accelerated transaction preference of the user, wherein the accelerated transaction preference includes a percentage of the transaction specified for acceleration and a remaining percentage of the transaction specified for processing through a standard system;

determining, by the transaction accelerator system, a settlement value in accordance with the transaction settlement data based on the accelerated transaction preference, wherein the settlement value represents a value equivalent to the transaction specified for acceleration; and storing, by the transaction accelerator system, the settlement value in an accelerated transaction database associated with an accelerated transaction account of the user in real-time.

16. The computer-readable medium of claim 15, the operations further comprising:

upon determining the accelerated transaction status of the user, generating, by the transaction accelerator system, an accelerated transaction prompt to the user; and receiving, by the transaction accelerator system, a response to the accelerated transaction prompt from the user.

17. The computer-readable medium of claim 16, the operations further comprising:

upon receiving the response to the accelerated transaction prompt, determining, by the transaction accelerator system, an eligibility of the user for opening the accelerated transaction account based on the account status.

18. The computer-readable medium of claim 15, the operations further comprising:

generating, by the transaction accelerator system, an accelerated transaction Application Programming Interface (API) message for opening the accelerated transaction account of the user.

19. The computer-readable medium of claim 15, wherein the accelerated transaction preference comprises an instruction for transmitting a first amount of the settlement value to the accelerated transaction database and a second amount of the settlement value to a database of an acquirer system associated with the user; and wherein the settlement value is associated with a purchase transaction fund amount associated with the user.

20. The computer-readable medium of claim 15, further comprising:

receiving, by the transaction accelerator system, the transaction settlement data in one or more batches.

* * * * *